United States Patent [19]

Allebest et al.

[11] Patent Number: 4,701,896
[45] Date of Patent: Oct. 20, 1987

[54] INTERACTIVE PLURAL HEAD LASER DISC SYSTEM

[75] Inventors: Edward F. Allebest, Riverside; Parley E. Hansen, Sunnymead; George A. Walsh, Costa Mesa; Walter R. Maguire, Newport Beach, all of Calif.

[73] Assignee: Resolution Research, Inc., Newport Beach, Calif.

[21] Appl. No.: 642,505

[22] Filed: Aug. 20, 1984

[51] Int. Cl.⁴ ............................................. G11B 17/22
[52] U.S. Cl. ........................................ 369/32; 369/35; 206/444
[58] Field of Search ...................... 369/30, 32, 35, 111, 369/33, 34, 36, 39, 75.1, 75.2, 76; 206/444, 445; 360/97, 98, 78, 72.1, 105

[56] References Cited

U.S. PATENT DOCUMENTS

| | | | |
|---|---|---|---|
| 2,457,668 | 12/1948 | Hart | 369/35 |
| 3,229,269 | 1/1966 | Namenyi-Katz | 360/98 |
| 3,774,172 | 11/1973 | Silverman | 369/34 |
| 4,387,452 | 6/1983 | Bricot et al. | 369/32 |
| 4,391,543 | 7/1983 | Elsing | 206/444 |

OTHER PUBLICATIONS

Krembs et al., "Multidisk Cartridge Access Device", IBM Tech. Disc. Bul., vol. 15, No. 4, Sep. 1972, pp. 1288–1289.
Ivis brochure, Digital Equipment Corporation.
Optical Disk File Memory for Computer Use, Yoshito Tsunoda.
Lasers Enhance Mass Storage, by Bergheim and McGeever, 6/25/84, *Info World*.
Interactive Video Disc Learning Systems, 11/83, High Technology.
Optical Document File System, Panasonic Industrial Company.
Optical Disks Foreseen, News in Perspective, *Datamation*, 6/1/84.

*Primary Examiner*—Donald McElheny, Jr.
*Attorney, Agent, or Firm*—Stetina and Brunda

[57] ABSTRACT

An interactive plural head laser disc system is disclosed characterized by use of plural pairs of heads installed on both sides of one or more laser discs which heads may be accessed by either multi or single users to independently and/or simultaneously access a single disc or plurality of discs. The plural heads are disposed inside a housing having a plurality of slots therein, each slot being configured to receive and permit mounting of a laser disc therein.

2 Claims, 11 Drawing Figures

U.S. Patent    Oct. 20, 1987    Sheet 1 of 2    4,701,896
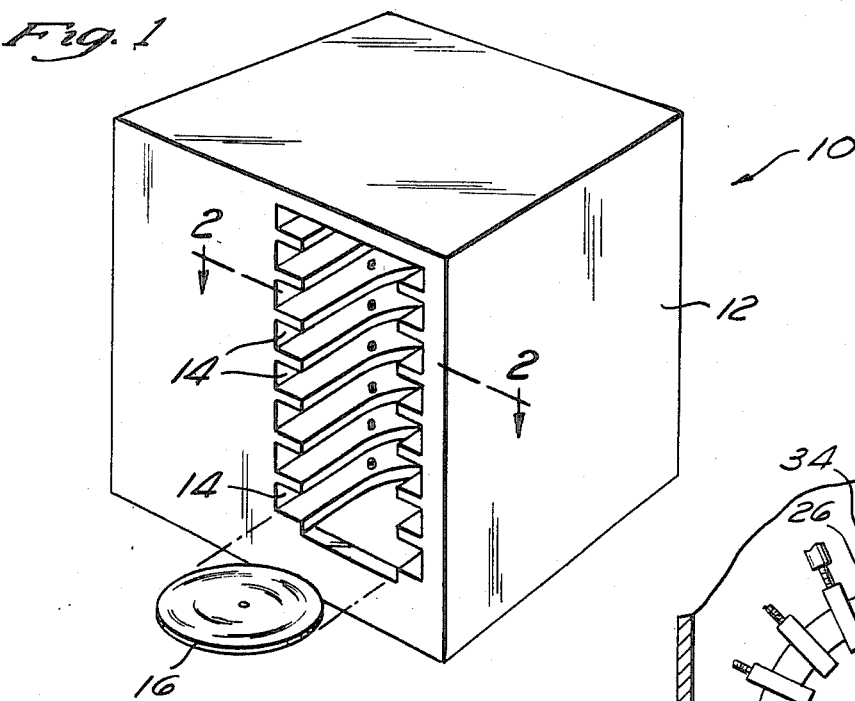
Fig. 1
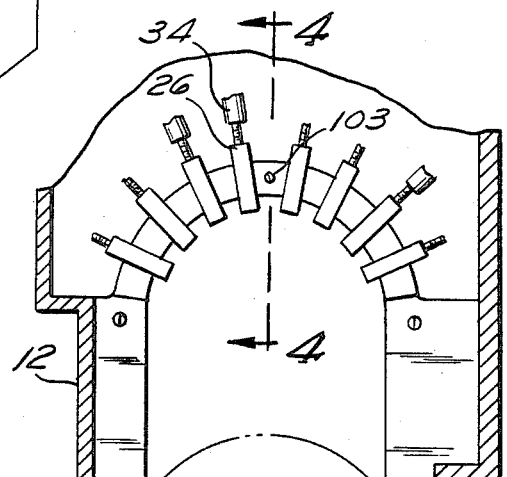
Fig. 2
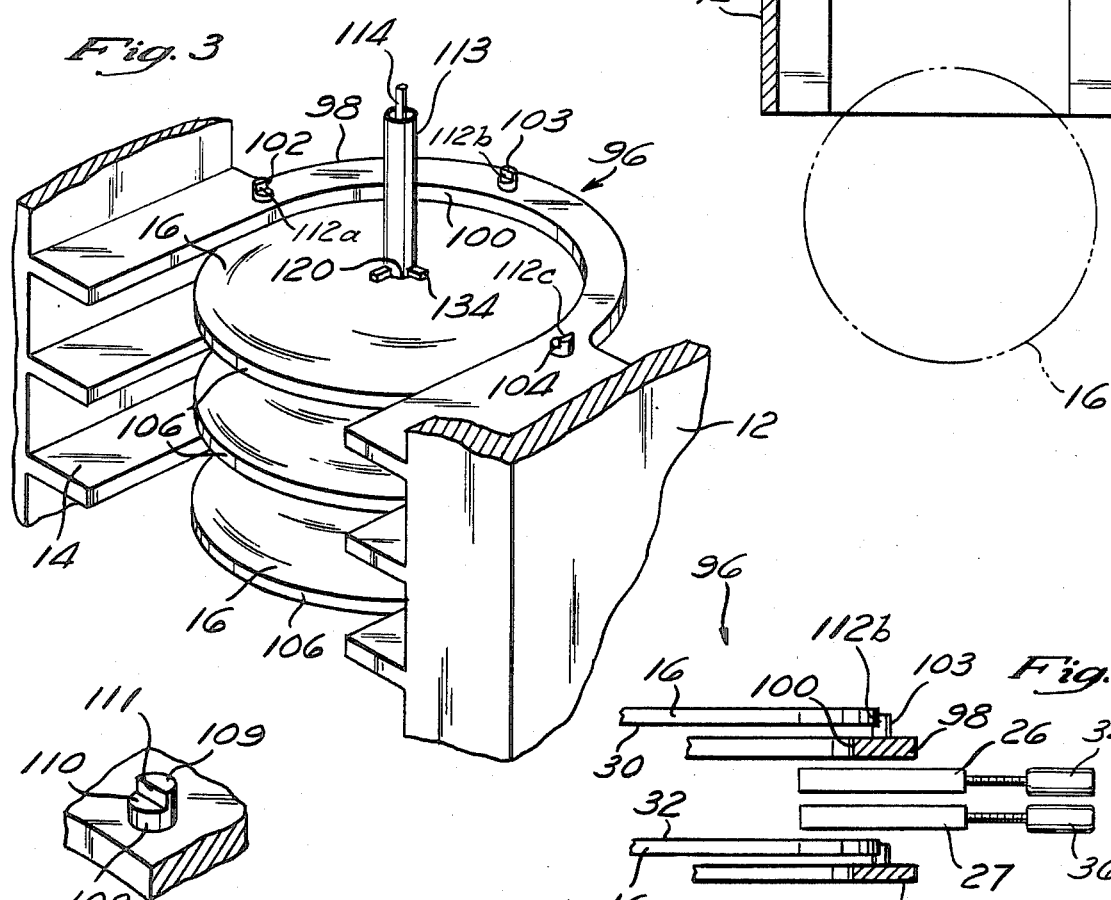
Fig. 3
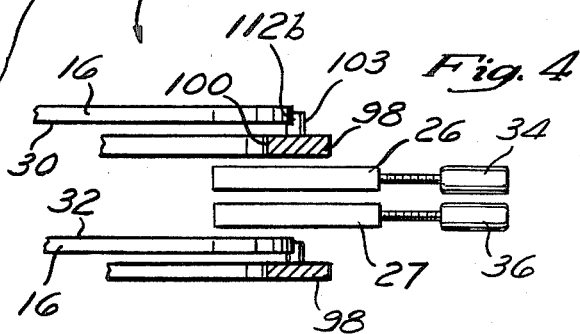
Fig. 4
Fig. 5

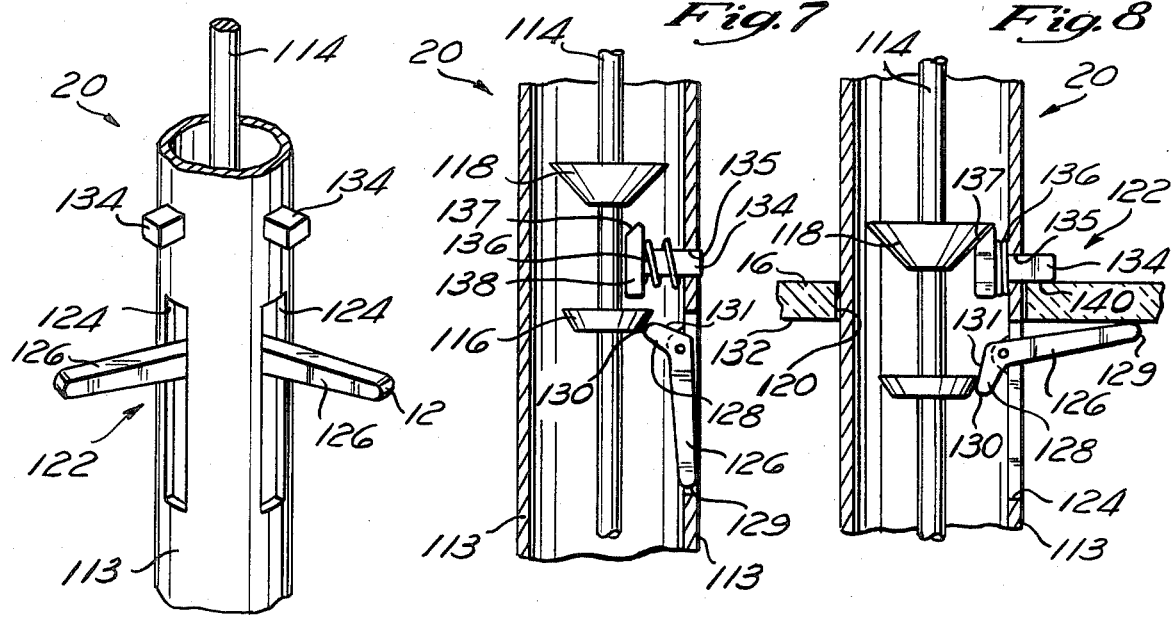
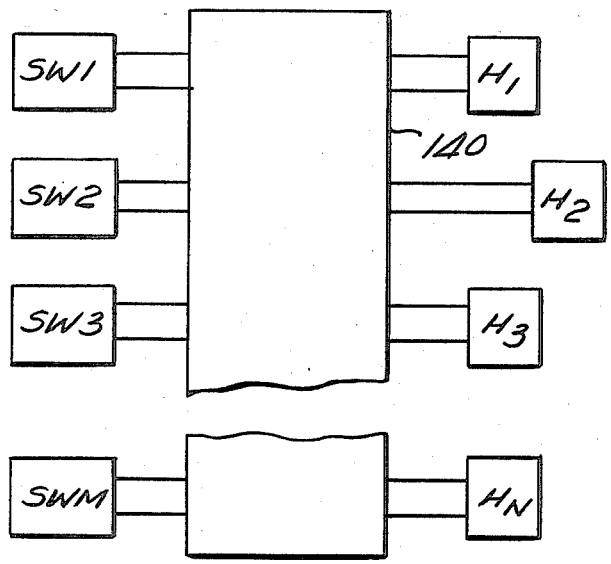
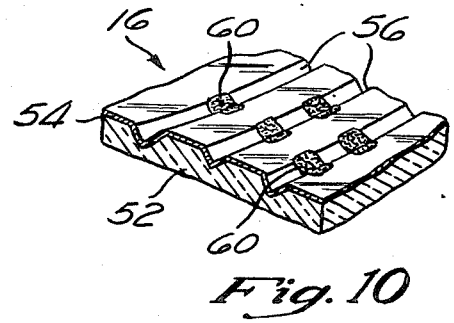
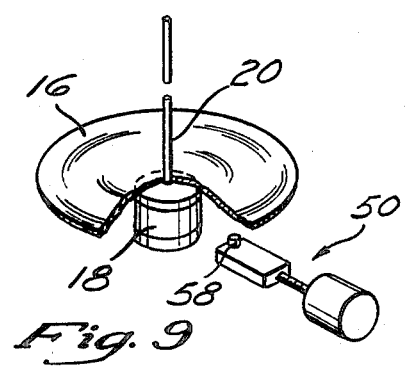

INTERACTIVE PLURAL HEAD LASER DISC SYSTEM

BACKGROUND OF THE INVENTION

This invention relates generally to laser disc digital data video storage systems and particularly to a laser disc digital and video storage system that permits a plurality of users to independently and stimultaneously access a single laser disc and permits a user to access a plurality of discs.

The interactive video disc, or laser disc, which combines video images recorded on disc with random-access capability has become an important educational tool because it combines the potential of many teaching devices. Interactive video discs bring together the emotional power of television and the interactive power of the computer. The interactive video disc has had a major impact on education, training, information services, retail sales and entertainment. The interactive video disc makes possible a powerful educational experience in which computer based educational systems can display video imagery, real-time action, and stereo sound. Such learning systems allow interactive teaching, learner control of materials and minimal supervision. An interactive video disc can simulate reality, thereby providing an effective and inexpensive alternative to hands-on experience.

Currently, interactive video discs are used in industrial training, point of sale, retailing and entertainment. The key advantage of the interactive video disc systems is their ability to respond to the user. Programs stored in the video disc requires the viewer to play an active part in the presentation of materials. For example, if a student believes he knows a subject, he can take a test immediately instead of going through the lesson. Whenever the student answers the questions, the computer indicates whether the answers are correct and may direct the disc to go ahead or return to a previous lesson according to the student's score. Interactivity allows students greater freedom so that they may choose the order in which they study sections of a subject. By contrast, more traditional methods of training, such as live lectures, video tape and books are linear in that all the material is presented in the same order to every student. In watching video tape and listening to lectures, the student is a passive observer, which is a less effective learning role than if the student were an active participant.

In order to make the student more active, a programming technique known as branching creates alternative routes through a given set of materials. Branching lets student perceive at their own pace, see any materials they need or want to see, be tested on their comprehension of the materials and receive remedial work where needed.

Like the interactive video disc, micro computers are capable of branching, but presently they can not equal the sophistication of the video display which is made possible because the video disc stores more data than magnetic storage media ordinarily used in connection with microcomputers. More than 400,000 bits of information are required to create a single image on a television screen. A typical microcomputer disc holds up to 5 million bits, which is only enough information to store about 12 video images. At a standard video playback speed of 30 frames per second, an entire magnetic disc will hold only 0.4 seconds of real-time video. In addition, microcomputers construct screen displays too slowly to show real-time video. In contrast, a video disc can hold up to an hour of real-time video on each side. Furthermore, a video disc is less expensive than video tape.

A disadvantage of present interactive video disc systems is that each user requires a separate video disc and disc drive in addition to a video monitor. There are many situations where it would be advantageous to provide access to a single video disc by multiple users or multiple video discs by multi-users. For example, in an archive, such as a library card catalog, it would be advantageous to have the entire archive stored upon a single disc, or a single set of discs for large archives, and have the archive available for independent access by plural users. In a product promotion display at a trade show, for example, it would be advantageous to provide a single video disc and disc drive and plural video monitors from which prospective customers could independently view and interact with material contained upon the disc or multiple discs.

SUMMARY OF THE INVENTION

The present invention provides an interactive video disc system which overcomes and alleviates the deficiencies of prior art systems. The video disc system of the invention provides multi-user capability and permits a plurality of users to have simultaneous access to both surfaces of each of a plurality of video discs mounted in a single disc drive system. The system provides independent user access to all tracks on all surfaces of the discs mounted in the disc drive. the multidisc system of the invention is constructed by stacking videodiscs upon a common drive shaft, which gives great capacity to the storage system and provides quick access to all data or video images stored within the laser disc storage module.

A pair of heads (such as read only, read and write heads) are installed on both sides of each disc for each user station to allow materials on each side of the discs to be accessed without the necessity of turning the discs over, which effectively doubles the storage capacity of the system as compared to prior art devices. The individual laser discs are removable and may be replaced by other laser discs. The invention includes a shaft having a spindle therein, which, when secured in place upon the shaft, actuates mechanisms for securing each disc to the shaft. The discs are located within slots in a housing and supported therein when the shaft is withdrawn to remove and replace a disc.

Each user station includes a selector panel or keyboard connected to a central processing unit. The output of the central processing unit is connected to a multiplexer that is also connected to each of the pairs of heads. A user at each user station selects a particular disc and track by inputting information as by way of a keyboard or pre-programmed format, for example, corresponding to the disc and track number. The central processing unit converts the disc and track data to a binary word which contains a number of bits sufficient to provide identification of a selected disc and track. The binary word address is input to the multiplexer, which outputs a signal to the head corresponding to the selected disc and to a positioning device which moves the head radially with respect to the selected disc to position the head for reading information from the selected track. Since any user station has access to any disc and track, a particular user need only enter numbers on a keyboard corresponding to the desired disc and track in order to select a desired portion of the array of video discs.

BRIEF DESCRIPTION OF THE DRAWINGS

FIG. 1 is a perspective view of the invention showing a housing including a plurality of slots therein and a laser disc for insertion into one of the slots for removal therefrom;

FIG. 2 is a cross-sectional view about line 2—2 of FIG. 1 illustrating placement of the heads within the slots;

FIG. 3 is a perspective view showing a plurality of laser discs mounted inside the slots to a shaft;

FIG. 4 is a cross-sectional view about line 4—4 of FIG. 2;

FIG. 5 is a perspective view of a pad included in FIG. 3 for supporting a laser disc when the shaft is removed from the housing;

FIG. 6 is a perspective view of apparatus used to support the discs of FIG. 3 upon the shaft for rotation within the housing;

FIG. 7 is a cross-sectional view illustrating the support mechanisms of FIG. 6;

FIG. 8 is a cross-sectional view of the support mechanisms of FIG. 7 engaged with a laser disc to hold it in position for use;

FIG. 9 is a perspective view of a drive motor, a drive shaft, a read/write head and a linear actuator for positioning the head;

FIG. 10 is a perspective view of a portion of a laser disc in an expanded scale showing the locations of dark spots formed thereon to store data; and FIG. 11 is a simplified block diagram of control cicuitry for enabling a user to select a particular disc and track in a multidisc drive system.

DESCRIPTION OF THE PREFERRED EMBODIMENT

Referring to FIG. 1, an interactive laser disc system 10 includes a housing 12 having a plurality of slots 14 therein for receiving a laser disc 16.

Referring to FIGS. 3 and 9, the interactive laser disc system 10 includes a drive motor 18 having an output disc drive shaft 20 to which the discs 16 are mounted. A plurality of video discs 16 are mounted to the disc drive shaft 20. As shown in FIG. 4, in the preferred embodiment a pair of read heads 26, 27 are associated with each of the discs 16 such that the read heads 26 and 27 face the lower side 30 and the upper side 32, respectively, of the discs 16. Those skilled in the art will recognize that the heads 26 and 27 may comprise read only heads or read and write heads. Therefore, for purposes of this application, the terms head and read head shall be defined to include both read only heads and read and write heads. Each of the read heads 26, 27 have corresponding linear drive mechanisms 34, 36 connected thereto for radially positioning the read heads 26, 27 relative to the disc 16 to read selected tracks thereon.

All the discs 16 have read heads and linear drive mechanisms (not shown) similar to the read heads 26, 27 and the linear drive mechanisms 34, 36.

Each disc 16 is formed to have information stored thereon for retrieval via an optical reading system 50, schematically illustrated in FIG. 9. The typical disc 16 is about 30mm in diameter and, as best shown in FIG. 10, comprises a substrate 52 having a recording layer 54 thereon formed for example, of Te-Se-Pb alloy. Vapor deposition techniques for depositing such alloys on substrates are well known in the art. The substrate 52 may be formed of glass having a plurality of grooves 56 therein. Exposing the recording material to light from a suitable source of coherent light, such as a laser diode 58, shown in FIG. 9, forms a pit 60, which is a darkened area in the disc 16. A plurality of such pits 60 may be formed in the disc 16 in patterns that form digital signals that may be read by the read heads 26, 27.

As shown in FIG. 9, the video disc system 10 includes a motor 18 having a shaft 20 extending therefrom. The discs 16 are mounted to the shaft 20 to be rotatable by the motor 18 at a speed of about 1,800 rpm.

Referring to FIGS. 1-4, the video discs 16 the disc drive motor 18, the read heads 26, 27 and the linear drive mechanisms 34, 36 are preferably mounted in the housing 12. The housing 12 also encloses electronic circuitry, shown in FIG. 11, for providing selective access to any particular disc and track.

Referring to FIGS. 1-5, the discs 16 are preferably inserted into corresponding slots 14. Each slot includes support structure 96, as best shown in FIGS. 3 and 4, which supports the discs 16 when the shaft 20 has been removed from the housing 12.

The support structure 96 includes a base 98 that may be formed to have an inner edge 100 that is an arc of a circle. Preferably, at least three pads 102-104 are mounted on the base 98 by a suitable adhesive. The pads 102-104 are preferably formed of a soft material such as rubber to preclude the possibility of scratching the discs 16 when they are supported by the base 98. The pads 102-104 arranged so that a circular arc connecting them will be greater than 180 degrees. The discs 16 have generally uniform mass distributions and are positioned relative to the pads 102-104 such that releasing the discs 16 from the shaft 20 causes the outer edges 106 of the discs 16 to be supported by the pads 102-104 in each of the slots 14 so that the shaft 20 may be removed without causing the discs 16 to fall out of alignment.

FIG. 5 illustrates the pad 102 in a scale expanded from that of FIG. 3. The pad 102 may have a lower portion 108 that is substantially cylindrical and an upper portion 109 that is generally a portion of a cylinder. The lower and upper portions 108 and 109 join to form a shelf 110, upon which the disc 16 rests when the shaft 20 is not engaged therewith. The upper portion 109 has an edge 111 that forms a stop to limit the distance that the disc 16 can be inserted into the housing 12. The other pads 103 and 104 are formed similar to the pad 102 and include stops 112b and 112c. The stops 112a, 112b and 112c cooperate to place the central axis of the disc 16 in alignment with the shaft 20 when the disc 16 is fully inserted into the slot 14 so that the edge of the disc 16 rests upon the shelves 110 and abuts the stops 112a-112c.

FIGS. 3, 6 and 7 show structural features of the shaft 20. The shaft 20 includes a hollow tube 113 and a rod 114 having a pair of cams 116 and 118 that correspond to each slot in the housing 12. The hollow tube 113 has an outer diameter sized to fit within a central aperture 120 of each video disc 16. The tube 113 has a plurality of support members 122 mounted in corresponding windows 124 for each of the slots 14. The tube 113 preferably has three support members 122 at that are angularly spaced by about 120 degrees.

Each of the support members 122 has a first arm 126 and a second arm 128 that extends at an angle away from the first arm. Each of the support members 122 is pivotally mounted in the corresponding windows 124 near the juncture of the first arm 126 and the second arm 128. The second arm extends into the tube 113 for selectively contacting the cam 116 when the rod 114 is fully inserted in the tube 113. As shown in FIG. 7, the first arm has a tip 129 which extends into the hollow tube 113 when the tube is vertically oriented and the rod 114 is positioned so that there is no contact between the cam 116 and the second arm 128. The tip 129 is preferably tapered inwardly to facilitate sliding the tube 113 into the central aperture 120 in the disc 16.

As shown in FIG. 8, when the rod 114 is advanced into the tube 113, the cam 116 contacts an end 130 of the second arm 128, causing the support member to pivot so that the first arm rotates out of the window 124 to contact the lower surface 132 of the disc 16 to lift it relative to the tube 113. As the rod 14 continues to advance into the tube 113, the cam 116 slides over the end 130 to exert a force on an edge 131 of the second arm 126 to hold the disc 16 at a desired position above the pads 102–104 so that the disc 16 may fully rotate.

The tube 113 also includes a stabilizing member 134 corresponding to each support member 122. The stabilizing member 134 is positioned within a radial passage 135 in the tube 113 and is biased by a spring 136 to normally lie entirely in the tube 113 in a retracted position shown in FIG. 7. The stabilizing member 134 has a generally wedge-shaped cam 137 on an inner end 138. The cam 137 positioned to contact the cam 118 when the cam 116 contacts the second arm 128 of the support 122. Motion of the cam 118 into the tube 113, therefore, forces the stabilizing member 134 from the retracted position to a protruded position in which the stabilizing member 134 projects out of the passage 135 so that a lower surface 140 of the stabilizing member 134 contacts the upper surface of the disc 16 when the cam 116 and support member 122 have lifted the disc 16 off the pads 102–104. Therefore, insertion of the rod 114 into the tube 113 causes the disc 16 to be held securely between the support members 122 and the stabilizing member 134.

Referring to FIGS. 1 and 3, the outer end of the rod 114 may include a cap 146 having a threaded portion for engagement with a corresponding threaded portion on the tube 113 to retain the cams 116 and 118 urged against the support members 122 and the stabilizer members 134, respectively, to hold the discs 16 in position for use.

As shown in FIG. 2, the read heads are arranged around approximately the same portions of the discs 16 as the pads 102–104. The primary limitation on the number of read heads that may be used with a single disc are the physical dimensions of the read heads 26, 27 and the necessity of having avoiding interference with removal and insertion of the discs 16 The read heads 26, 27 should be spaced apart so that they do not contact one another while in use.

FIG. 11 is a simplified block diagram of the control and selection circuitry for use in selecting a particular disc and track. The system includes a plurality of CPU switches SW1, SW2 ... SWM with each CPU switch corresponding to a particular user station. Each CPU switch is connected to a multiplex bus, which is connected to each of a plurality of read heads H1, H2, H3 ... HN. The control circuitry allows each of N users to activate the N reads heads to access a particular disc 16 and track thereon.

The length of the address word required to permit selection of a particular disc and track depends upon the number of discs in the system and the number of tracks on each disc. For example, if the system has a stack of ten discs with 56,000 tracks per disc, then there must be twenty separate disc addresses and 56,000 separate track addresses. The addresses may conveniently be in the form of binary numbers. Since 20 is between $2^4=16$ and $2^5=32$, five bits are required to identify the selected disc. Similarly, since 56,000 is between $2_{15}$ and $2^{16}$, sixteen bits are required to identify each of the 56,000 tracks. Therefore, a twenty-one bit binary nuber is required to address a particular disc and track in a stack of ten discs with 56,000 tracks per disc.

What is claimed is:

1. An optical disc data storage and retrieval system for reading information stored on a plurality of optical discs having a plurality of tracks for storing information, comprising:
    a disc drive shaft;
    means for mounting a plurality of discs to the disc drive shaft spaced apart along the length thereof, the disc drive shaft being selectively engageable with the disc such that the discs are rotatable with the disc drive shaft;
    said drive shaft and mounting means being mounted inside a housing having a plurality of slots therein, each slot being configured to receive a disc;
    a plurality of read heads positioned proximate each of the discs for reading information stored thereon;
    means for providing access to each disc in track thereon independently of the other disc and tracks; and
    support means for supporting the disc in the slots when the disc drive shaft is disengaged from the disc;
    wherein the disc drive shaft includes means for selectively lifting each disc off the support means and engaging the disc for rotation with the disc drive shaft.

2. The system of claim 1 wherein the engaging means includes:
    a rod inside the disc drive shaft;
    a first cam mounted to the rod for each disc location;
    a second cam mounted to the rod for each disc location;
    lifting means actuatable by the first cam for lifting each disc off its shelf; and
    stop means actuatable by the second cam for stopping motion of the discs so that each disc is retained between the lifting means and the stop means.

* * * * *